United States Patent [19]

Hashemi

[11] Patent Number: 5,318,723

[45] Date of Patent: Jun. 7, 1994

[54] CERAMIC MATERIAL AND PROCESS FOR ITS PRODUCTION

[75] Inventor: Tooraj Hashemi, Belmont, Great Britain

[73] Assignee: Elmwood Sensors, Ltd., England

[21] Appl. No.: 741,513

[22] PCT Filed: Feb. 7, 1990

[86] PCT No.: PCT/GB90/00186

§ 371 Date: Oct. 8, 1991

§ 102(e) Date: Oct. 8, 1991

[87] PCT Pub. No.: WO90/09669

PCT Pub. Date: Aug. 23, 1990

[30] Foreign Application Priority Data

Feb. 8, 1989 [GB] United Kingdom ............... 8902788

[51] Int. Cl.$^5$ .............................................. H01B 1/08
[52] U.S. Cl. ............................. 252/518; 252/519; 252/520; 252/521; 501/134; 501/135
[58] Field of Search ............... 501/134, 135; 252/518, 252/519, 520, 521; 429/220, 218

[56] References Cited

U.S. PATENT DOCUMENTS

| | | | |
|---|---|---|---|
| 4,222,885 | 9/1980 | Hennings et al. | 501/136 X |
| 4,244,830 | 1/1981 | Hennings et al. | 501/138 |
| 4,284,521 | 8/1981 | Payne et al. | 501/136 X |
| 4,347,167 | 8/1982 | Payne et al. | 501/138 X |
| 4,425,556 | 10/1984 | Hanke et al. | |
| 5,008,163 | 4/1991 | Smith et al. | 252/518 X |

FOREIGN PATENT DOCUMENTS

| | | |
|---|---|---|
| 41860/72 | 5/1971 | Australia . |
| 0040391 | 5/1981 | European Pat. Off. . |
| 2304032 | 1/1973 | Fed. Rep. of Germany . |
| 620437 | 11/1944 | United Kingdom . |
| 2008555 | 11/1978 | United Kingdom . |

OTHER PUBLICATIONS

"Ceramics as Electrical Materials" vol. 5, pp. 292, 294 & 299 Sprechsaal 107. Jahrgang-pp. 1057–1060, 1974.
Journal of the Electrochemical Society, Jul. 1987, pp. 1591–1594.

*Primary Examiner*—Karl Group
*Attorney, Agent, or Firm*—Birch, Stewart, Kolasch & Birch

[57] ABSTRACT

Conductive ceramic materials are provided which have resistivities at room temperature of less than $10^{-3}$ $\Omega$.cm. These novel materials may be made by forming a ceramic starting material comprising oxides of at least two different metals, one of which is capable of existing in a $+2$ oxidation state and one of which is capable of existing in a $+4$ oxidation state and exposing the ceramic starting material to reducing conditions.

34 Claims, No Drawings

CERAMIC MATERIAL AND PROCESS FOR ITS PRODUCTION

BACKGROUND OF THE INVENTION

The present invention relates to ceramic materials having low resistivities and processes for their production.

DESCRIPTION OF RELATED ART

Electrically conductive ceramic materials are used in many fields where advantage is taken of their characteristic electrical properties. Thus, for examples, conductive ceramics are used in the manufacture of electrical components such as resistance elements, capacitors and semi-conductor devices. Generally, however, ceramic materials have relatively high resistivities, typically greater than $10^{-1}$ $\Omega$.cm. Thus, for example, evaporated films of stannic oxide ($SnO_2$) are widely used as electrical resistance elements, but resistivities less than $10^{-1}$ $\Omega$.cm are difficult to obtain. Resistances of 1 to 10 $\Omega$.cm can be observed in freshly prepared samples of cadmium oxide (CdO) but this material is relatively unstable. Resistivities in the range $10^{-1}$ to $10^{-3}$ $\Omega$.cm have been observed in sintered samples of cadmium stannate (see T. Hashimi et al., *J. Electrochem. Soc.* 134 (1987) pp. 1591–1594) where the use of such relatively low resistivity ceramic materials in the manufacture of electrodes for secondary electrochemical cells is described. However hitherto, the production of ceramic materials having resistivities substantially less than $10^{-3}$ $\Omega$.cm has never been described.

The production of such low resistivity ceramic materials would be highly desirable, as it would enable such materials to be used in place of metals, which typically have resistivities in the range $10^{-3}$ to $10^{-7}$ $\Omega$.cm. Thus, for example, low resistivity ceramics could be used in corrosive environments, where hitherto expensive noble metals such as platinum and gold have hitherto been used.

SUMMARY OF THE INVENTION

We have now developed a highly conductive ceramic material which has a resistivity at ambient temperature of less than $10^{-3}$ $\Omega$.cm.

The ceramic materials according to the invention would normally not have resistivities lower than $10^{-7}$ $\Omega$.cm. Samples have, however, been produced with resistivities less than $10^{-4}$ $\Omega$.cm.

The conductive ceramic materials according to the invention generally comprise an ionic lattice of metal ions and oxygen ions wherein at least a portion of the metal ions are ions of a metal capable of existing in a plurality of valence states, and wherein ions of at least two different metals are present, one of which is capable of existing in a +2 oxidation state and one of which is capable of existing in a +4 oxidation state and wherein at least one of said two different metals is present in the form of ions having different oxidation states.

The presence of ions of different oxidation states is achieved according to one embodiment of the invention by exposing a ceramic starting material to reducing conditions, for example by exposing it to a reducing atmosphere. Alternatively ions of one or more of the metals may be maintained in different oxidation states by incorporating one or more dopants in the ceramic material. Examples include electron-donating dopants, such as trivalent metal oxides, e.g., $Sb_2O_3$ or $Bi_2O_3$.

The invention also provides a method of producing a ceramic material having a resistivity at ambient temperature of less than $10^{-3}$ $\Omega$.cm, which comprises forming a ceramic starting material comprising at least two different metals in the form of oxides, one of which is capable of existing in a +2 oxidation state and one of which is capable of existing in a +4 oxidation state, said ceramic starting material having a resistivity greater than $10^{-3}$ $\Omega$.cm and exposing the ceramic starting material to reducing conditions, generally at an elevated temperature. Preferably the ceramic starting material is exposed to a reducing atmosphere, for example gaseous hydrogen although other methods may be employed, for example electrochemical polarization.

The selection of the metal oxide components of the ceramic starting material and the processing conditions are major factors contributing to the low resistivity of the resulting ceramic material. Oxides of individual metals may be mixed and subjected to conventional procedures for forming ceramics such as compacting, and sintering. Alternatively, mixed oxides or salts comprising at least two metals may be subjected to such procedures whereby the starting materials are converted to metal oxide form during processing.

Thus the metal capable of existing in a +2 oxidation state (hereinafter referred to as "the first metal") is preferably selected from groups Ib, IIa, IIb and VIII of the periodic table, most preferably from Cu, Zn, Cd, Fe, Sr and Ca.

The metal capable of existing in a +4 oxidation state (hereinafter referred to as "the second metal") is preferably selected from group IVa and IVb of the periodic table or is a lanthanide. Most preferably, the metal is Ti, Ge, Sn, Pb, Ce or Pr.

Examples of empirical formulae which may be written for ceramic materials formed from metals existing in the +2 and +4 oxidation states include $ABO_3$ and $A_2BO_4$ wherein A and B represent the first and second metals respectively. Intermediate compositions may be formed by varying the proportions of starting materials and generally the ceramic starting material used in the method of the invention may have an intermediate composition which may be described by the general formula $A_{2-x}BO_{4-x}$ where x is in the range 0 to 1. Often, the ceramic starting material may, on analysis, be found to have a non-stoichiometric composition, which may be represented by the formula $A_{2-x}BO_{4-x \pm y}$ where y is less than 0.1. After having been exposed to reducing conditions, the ceramic starting material will become oxygen deficient and the resulting highly conductive ceramic material may be represented by the formula $A_{2-x}BO_{4-x-y}$. Other ions, particularly monovalent species will generally be present to provide the necessary charge balance.

Ceramic starting materials may also be used in accordance with the invention which include an excess of one or the other of the aforementioned metal oxides and/or other metal oxides.

The ceramic starting material used in the method of the invention may be produced by conventional techniques, for example by the co-comminution of metal oxides or by the co-precipitation of insoluble compounds of the metals, e.g. oxides, hydroxides or carbonates followed, if necessary, by calcining. Preferably, however, oxides of the first and second metals are co-comminuted by, for example ball-milling, followed by compacting so as to form a "green" pellet under high pressure. The resulting pellet may then be sintered, preferably in an oxidizing atmosphere, for example air, so as to form a solid, ceramic body. The ceramic body so-formed will generally be found to have a resistivity typical of conventional ceramic materials, i.e. greater than $10^{-1}$ $\Omega$.cm, although when certain combinations of metal oxides are used, for example cadmium oxide and tin oxide as described in the procedure of Hashimi et al. supra, resistivities as low as $10^{-3}$ $\Omega$.cm may be observed.

In order to form a ceramic material having a resistivity less than $10^{-3}$ $\Omega$.cm in accordance with the invention, it is generally necessary to expose the ceramic starting material to reducing conditions. Thus, for example, the ceramic starting material may be exposed to a reducing atmosphere, or it may be reduced electrochemically by exposing the material to an electrolyte and subjecting the material to electrochemical polarisation.

A preferred method is to subject the ceramic starting material to a heat treatment or annealing step under a reducing atmosphere. As indicated above, such treatment may be unnecessary if the ceramic starting material contains dopants capable of introducing electron-deficient centres into the lattice. Preferably, the annealing step is carried out in the presence of hydrogen which optionally may be dilluted with an inert gas such as, for example, nitrogen. Most preferably the reducing gas comprises 10 to 60% by volume hydrogen with the balance being provided as an inert gas.

The annealing step is preferably carried out at a temperature greater than 250° C., most preferably in the range 300° to 500° C.

Prior to carrying out the step of exposing the ceramic starting material to reducing conditions in accordance with the invention, the starting material may be subjected to standard procedures for controlling the density, porosity and shape. Thus, for example, standard techniques used in ceramic processing may be employed such as, for example, hot isostatic pressing, extrusion, compaction and molding.

The resulting low resistivity ceramic material formed in accordance with the invention may be subjected to a grinding step in order to form a highly conductive ceramic powder. However if the material is required in powder form, a preferred procedure is to prepare the ceramic starting material in powder form using a procedure such as, for example flame spraying or spray pyrolysis heating and then if necessary, exposing the so-formed ceramic powder to a reducing atmosphere at an elevated temperature in the manner described above.

Ceramic materials may be formed by the process of the invention which have resistivities which are comparable to those of metals. Typically, resistivities of $10^{-4}$ $\Omega$.cm and lower are achievable. Specimens have been produced according to the invention which have resistivities lower than $10^{-5}$ $\Omega$.cm, e.g. around $10^{-6}$ $\Omega$.cm, which approach the resistivities of noble metals. Further, the low resistivity ceramic materials produced according to the invention are relatively stable and test specimens have been produced which continue to exhibit resistivities as low as $10^{-5}$ $\Omega$.cm after being kept for 2 weeks at room temperature.

The production of ceramic materials having a resistivity less than $10^{-3}$ $\Omega$.cm in accordance with the invention is entirely unexpected and the theoretical basis for the observed low resistivities has not yet been determined. Possibly, the observed conductivity is a result of a mechanism dependent upon the existence of oxygen vacancies in the crystal lattice. The observed conductivity may stem from a mechanism which is analogous to the mechanisms for electrical conductance suggested for semi-conductors. It is to be noted, however, that the low resistivity ceramic materials produced according to the invention do not need to be maintained in an oxygen-free atmosphere at room temperature in order for the low resistance properties to be maintained.

DETAILED DESCRIPTION OF THE INVENTION

The production of a highly conductive ceramic material according to the invention will now be described in the following Examples.

EXAMPLE 1

A ceramic material based on copper and tin oxides was prepared by mixing cuprous oxide (CuO) and stannic oxide ($SnO_2$) in a molar ratio $CuO:SnO_2$ of 2:1.

The mixed oxides were ball-milled for 16 hours using a Syalon milling medium and the comminuted oxides were then filtered and dried.

The comminuted oxides were then compacted into the form of a green pellet at a pressure of 2000 kg/cm$^2$. The resulting pellet was sintered in air at 1050° C. for 12 hours to form a solid sintered body. Preliminary experiments revealed that sintering at only 950° C. resulted in an incompletely sintered ceramic material which was of a greyish colour throughout. Sintering at 1050° C. resulted in the formation of a well sintered body with a greyish outer surface. The interior of the sintered body was of a reddish shade, believed to be due to the presence of $Cu^{1+}$ ion species. Typically, the resulting ceramic material had a high resistivity of around 500 $\Omega$.cm.

The ceramic starting material so formed was then annealed by heating at a temperature of 350° C. for 16 hours in an atmosphere consisting of 40 vol. % hydrogen and 60 vol. % nitrogen.

After cooling, the resulting ceramic pellet had a resistivity of only $3 \times 10^{-5}$ $\Omega$.cm (as measured using a 4 probe measuring technique).

Samples of the annealed and reduced ceramic pellets were sectioned and it was noted that the reddish interior had disappeared and the pellets were of a uniform light grey colour throughout. Furthermore, both the interior and surface regions of the annealed ceramic pellet had a uniform low resistivity of about $3 \times 10^{-5}$ $\Omega$.cm.

EXAMPLE 2

In a further trial, equimolar quantities of tin oxide and potassium hydroxide were heated together, in the absence of water, at 300° C. The resulting potassium stannate ($K_2SnO_3$) was cooled, dissolved in water and filtered.

The solution was mixed with an equimolar quantity of aqueous cupric sulphate and the resulting precipitate collected, washed and dried. X-ray diffraction showed it to be amorphous or microcrystalline, with no distinctive peaks indicative of a pronounced crystal structure.

The powder was compressed and heated to 1200° C., the product turned a reddish colour and X-ray diffraction showed a change in crystalline state to have occurred.

The fired pellet was then heated at 350° C. for eight hours in a 60/40 v/v stream of $H_2/N_2$. The colour changed to a dark grey shade and on cooling the material was found to have a resistivity (measured by a 4-probe technique) of about $10^{-4}$ Ω.cm.

EXAMPLE 3

A ceramic material based on zinc and tin oxides was prepared in Example 1. After being compacted to form a green pellet, the comminuted oxides were fired in air at about 1280° C., which resulted in a sintered body with white colour.

The resulting sintered body (which had a high electrical resistance) was then annealed in a $H_2/N_2$ atmosphere at 450° C. for 12 hr. The resulting pellet had resistivity of less than about $10^{-3}$ Ω.cm.

Samples of both the fired and annealed ceramic were mixed with powdered silver, compacted and fired again at about 1000° C. for 10 hrs, either in air or in an $N_2$ atmosphere. The resulting composites showed extremely high electrical conductivity and once incorporated in a thermostat as a contact element, showed excellent properties.

The highly conductive ceramic materials which may be produced in accordance with the invention are of particular use in the manufacture of electrodes for rechargeable (secondary) electrochemical cells. Such use takes advantage not only of the high conductivity of the ceramic materials of the invention, but in view of the valence changes which the metal ion components are capable of undergoing, electrochemical energy may be stored in the ceramic material by increasing the proportion of lower valence state ion species by connecting the cell to an external power supply with the ceramic electrode connected to the anode. Charged electrochemical cells formed using conductive ceramic materials according to the invention have been found to have a particularly highly stable open circuit terminal voltage. Further, the ceramic material is corrosion resistant.

A particular advantage of the use of conductive ceramic materials of the invention in the manufacture of battery electrodes is that it eliminates the need to form conductive elements of graphite and/or carbon black and the inherent strength of the material can eliminate the need to include a supporting metal base for the electrode or a contact cap.

By utilising conductive ceramic materials according to the invention in porous form, the effect of surface area of the electrode can be increased, thus increasing the area of contact with electrolyte.

A typical electrochemical cell utilising a conductive ceramic material according to the invention was set up using a cathode formed of $Cu_2SnO_4$ produced by the procedure described in Example 1, an anode formed of nickel coated with hydrated nickel oxide (NiOOH) and a 1M NaOH electrolyte.

The cell was charged by connecting it to a 2 volt power supply following which a stable open circuit voltage of 0.96 V was obtained. The open circuit voltage dropped to 0.89 V after 2 weeks when the test was terminated owing to evaporation of electrolyte.

The highly conductive ceramic material of the invention in powder form is particularly useful in the production of conductive materials which hitherto have relied upon the use of carbon black or metal powder as a conductive filler.

The conductive ceramic materials according to the invention are less expensive than equivalent precious metal fillers and they can also be manufactured to give a smaller particle size than is possible with metals. Further, the ceramic materials do not oxidise, thus avoiding a disadvantage of known non-precious metal fillers. Example of specific applications include the manufacture of conductive adhesives, electrostatic screening materials and polymer based PTC (positive temperature co-efficient) devices.

A thermally and electrically conductive adhesive was produced from a conductive ceramic material according to the invention by dissolving polystyrene in an organic solvent and adding the conductive ceramic powder to the resulting solution. After evaporation of the solvent, the resulting polymer was both thermally and electrically conductive and adhered well to both metallic and non-metallic substrates. Adhesives produced according to the invention have advantages over known electrically and thermally conductive adhesives as a result of the relatively low expense of the raw materials, the possibility of producing the conductive ceramic material with a small particle size and the resistance of the ceramic material to oxidation.

Conductive ceramic materials according to the invention are also particularly useful in the manufacture of electrical contacts. By virtue of their resistance to oxidation, they are capable of extending the service life of contact systems in, for example, switch gear and avoid the capacitance problem associated with known contact systems resulting from the creation of surface oxide films on metal surfaces, This in turn reduces arcing and hence reduces contact erosion. Erosion may be further avoided even if arcing does occur because of the relatively high melting point of the ceramic material. Radio frequency emissions are also reduced in view of the reduced tendency to arcing and the contact surfaces have improved dimensional stability. Additionally, it has been found that the fluids used to reduce arcing in conventional contact systems and which are often corrosive to metals do not adversely affect the novel ceramic materials of the invention.

Additional applications of conductive ceramic materials according to the invention include contact electrodes for photovoltaic cells, in which case it is particularly advantageous for the ceramic material to be applied in a thin transparent layer. Humidity sensors may also be produced from $CuTiO_3$ or $SrCeO_3$ based ceramic materials dopped with Y or Yb.

By introducing $PbSnO_3$ into a barium titanate ceramic material, conductive ceramic materials may be produced according to the invention which additionally exhibit a piezoelectric effect. By utilising appropriate metal oxides, ferroelectric ceramic materials may also be produced.

I claim:

1. A conductive ceramic material which has a resistivity at ambient temperature of less than $10^{-1}$ Ω.cm, comprising an ionic lattice of metal ions and oxygen ions wherein at least a portion of said metal ions are ions of a metal which exists in a plurality of valence states, and wherein ions of at least two different metals A and B are present, wherein at least some of said metal A exists in a +2 oxidation state, wherein at least some of said metal B exists in a +4 oxidation state, and wherein at least one of said two different metals A and B is present in the form of ions having different oxidation states.

2. The conductive ceramic material according to claim 1, which has a resistivity at ambient temperature of less than $10^{-4}$ Ω.cm.

3. The conductive ceramic material according to claim 1 or claim 2, wherein the presence of ions of different oxidation states is achieved by exposing a ceramic starting material to reducing conditions.

4. The conductive ceramic material according to claim 1, wherein the presence of ions of different oxidation states is achieved by exposing a ceramic starting material to a reducing atmosphere.

5. The conductive ceramic material according to claim 1 or claim 2, wherein the presence of ions of different oxidation states is achieved by incorporating one or more electron-donating dopants in said ceramic material.

6. The conductive ceramic material according to claim 5, wherein said dopants comprise trivalent metal oxides selected from the group consisting of $Sb_2O_3$ and $Bi_2O_3$.

7. The conductive ceramic material according to claim 1, comprising metal oxides of said first metal A and said second metal B, said first metal A being a metal selected from group Ib, IIa, IIb and VIII of the periodic Table, and said second metal B being a metal selected from group IVa and IVb of the Periodic Table and the lanthanides.

8. The conductive ceramic material according to claim 7, wherein said first metal A is a member selected from the group consisting of Cu, Zn, Cd, Fe, Sr and Ca.

9. The conductive ceramic material according to claim 7, wherein said second metal is a member selected from the group consisting of Ti, Ge, Sn, Pb, Ce and Pr.

10. The conductive ceramic material according to claim 7, wherein said first metal B a member is copper and said second metal B is tin.

11. The conductive ceramic material according to claim 1, having the empirical formula $A_{2-x}BO_{4-x-y}$, wherein x is from 0 to 1, and y is less than 0.1.

12. A method of producing a ceramic material having a resistivity at ambient temperature of less than $10^{-3}$ $\Omega.cm$, which comprises forming a ceramic starting material comprising oxides of at least two different metals A and B, wherein at least some of said metal A exists in a +2 oxidation state, wherein at least some of said metal B exists in a +4 oxidation state, and wherein at least one of said two different metals A and B is present in the form of ions having different oxidation states, and exposing said ceramic starting material to reducing conditions.

13. The method according to claim 12, wherein said ceramic starting material is exposed to a reducing atmosphere at an elevated temperature.

14. The method according to claim 13, wherein said ceramic starting material is exposed to gaseous hydrogen.

15. the method according to claim 12, wherein said ceramic starting material is subjected to electrochemical polarisation.

16. The method according to any one of claims 12 to 15, wherein said ceramic starting material has the formula $A_{2-x}BO_{4-x\pm y}$, wherein x is from 0 to 1, and y is less than 0.1.

17. The method according to any one of claims 12 to 15, wherein said metal known to exist A state is selected from group Ib, IIa, IIb and VIII of the Periodic Table.

18. The method according to claim 17, wherein said metal A state is selected from the group consisting of Cu, Zn, Cd, Fe, Sr and Ca.

19. The method according to any one of claims 12 to 15, wherein said metal B is selected from group IVa and IVb of the Periodic Table, or is a lanthanide.

20. The method according to claim 19, wherein said metal B is a member selected from the group consisting of Ti, Ge, Sn, Pb, Ce and Pr.

21. The method according to any of claims 12 to 15, wherein said ceramic starting material is exposed to hydrogen which is diluted with an inert gas.

22. The method according to claim 21, wherein said ceramic starting material is exposed to a reducing gas which comprises 10 to 60% by volume hydrogen, with the balance being provided as an inert gas.

23. The method according to any of claims 12 to 15, wherein the exposure to reducing conditions carried out at a temperature greater than 250° C.

24. The method according to claim 23, wherein said temperature is in the range 300° to 500° C.

25. The conductive ceramic material according to claim 3, wherein the presence of ions of different oxidation states is achieved by exposing a ceramic starting material to an electrolyte, and subjecting said material to electrochemical polarisation.

26. A conductive ceramic material which has a resistivity at ambient temperature of less than $10^{-3}$ $\Omega.cm$, comprising an ionic lattice of metal ions and oxygen ions wherein at least a portion of said metal ions are ions of a metal which exists in a plurality of valence states, and wherein ions of at least two different metals A and B are present, wherein at least some of said metal A exists in a +2 oxidation state, wherein at least some of said metal B exists in a +4 oxidation state, and wherein at least one of said two different metals A and B is present in the form of ions having different oxidation states, wherein said metal A is one selected from group Ib, IIa, IIb, and VIII of the Periodic Table, and wherein said metal B is one selected from group IVa and IVb of the Periodic Table, and the lanthanides.

27. The conductive ceramic material according to claim 26, wherein said metal A is a member selected from the group consisting of Cu, Zn, Cd, Fe, Sr, and Ca.

28. The conductive ceramic material according to claim 26, wherein said metal B is a member selected from the group consisting of Ti, Ge, Sn, Pb, Ce, and Pr.

29. The conductive ceramic material according to claim 26, wherein said metal A is copper, and wherein said metal B is tin.

30. The conductive ceramic material according to claim 26, having the empirical formula $A_{2-x}BO_{4-x-y}$, wherein said metal A is selected from group Ib, IIa, IIb, and VIII of the Periodic Table, said metal B is selected from group IVa and IVb of the Periodic Table, and the lanthanides, x is from 0 to 1, and y is less than 0.1.

31. A method of producing a ceramic material having a resistivity at ambient temperature of less than $10^{-3}$ $\Omega.cm$, which comprises forming a ceramic starting material comprising oxides of at least two different metals A and B, wherein at least some of said metal A exists in a +2 oxidation state, wherein at least some of said metal B exists in a +4 oxidation state, and wherein at least one of said two different metals A and B is present in the form of ions having different oxidation states, and exposing said ceramic starting material to reducing conditions, wherein said metal A is one selected from group Ib, IIa, IIb, and VIII of the Periodic Table, and wherein said metal B is one selected from group IVa and IVb of the Periodic Table, and the lanthanides.

32. The method according to claim 31, wherein said ceramic starting material has the formula $A_{2-x}BO_{4-x-y}$, wherein x is from 0 to 1, and y is less than 0.1.

33. The method according to claim 32, wherein said metal A is a member selected from the group consisting of Cu, Zn, Cd, Fe, Sr, and Ca.

34. The method according to claim 32, wherein said metal B B is a member selected from the group consisting of Ti, Ge, Sn, Pb, Ce, and Pr.

* * * * *